(12) United States Patent
Collins

(10) Patent No.: US 7,387,113 B2
(45) Date of Patent: Jun. 17, 2008

(54) BREATHER FOR A MOTORCYCLE ENGINE

(75) Inventor: Robert W. Collins, Westminster, CO (US)

(73) Assignee: Dale A. Jones, Wheat Ridge, CO (US)

( * ) Notice: Subject to any disclaimer, the term of this patent is extended or adjusted under 35 U.S.C. 154(b) by 0 days.

(21) Appl. No.: 11/551,341

(22) Filed: Oct. 20, 2006

(65) Prior Publication Data
US 2008/0092863 A1    Apr. 24, 2008

(51) Int. Cl.
*F02M 25/26* (2006.01)

(52) U.S. Cl. .................................... 123/572

(58) Field of Classification Search ........ 123/572–574, 123/41.86
See application file for complete search history.

(56) References Cited
U.S. PATENT DOCUMENTS

| | | | |
|---|---|---|---|
| 3,834,365 A | 9/1974 | Ussery | |
| 4,013,051 A * | 3/1977 | Parcels | 123/573 |
| 4,453,525 A | 6/1984 | DeBruler | |
| 4,459,966 A | 7/1984 | Sakano et al. | |
| 5,205,848 A | 4/1993 | Blanc et al. | |
| 5,233,967 A * | 8/1993 | Peller | 123/572 |
| 5,551,409 A | 9/1996 | Sanders | |
| 6,105,560 A | 8/2000 | Daidone | |
| 6,167,849 B1 | 1/2001 | Wilson | |
| 6,345,613 B1 * | 2/2002 | Hoffmann et al. | 123/572 |
| 6,422,224 B1 * | 7/2002 | Walker, Jr. | 123/572 |
| 6,729,316 B1 | 5/2004 | Knowles | |
| 6,925,994 B2 | 8/2005 | Michel | |

\* cited by examiner

*Primary Examiner*—M. McMahon
(74) *Attorney, Agent, or Firm*—Dorr, Carson & Birney, P.C.

(57) ABSTRACT

A breather for a motorcycle engine separates and traps oil droplets entrained with crankcase gases. The breather has a container with a removable lid, an inlet for crankcase gases and entrained oil droplets extending through the lid into the container, filter media within the container to trap entrained oil droplets in the crankcase gases in the container, and outlet ports in the lid allowing gases to escape from within the container.

10 Claims, 6 Drawing Sheets

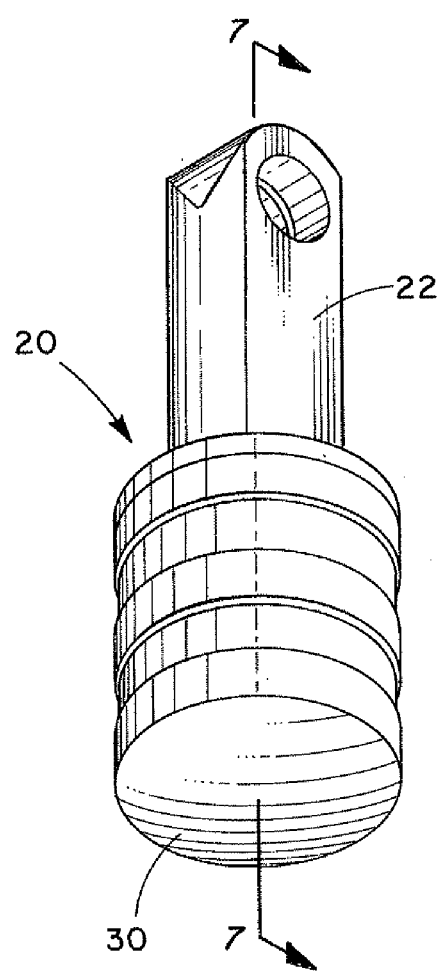
*Fig. 5*
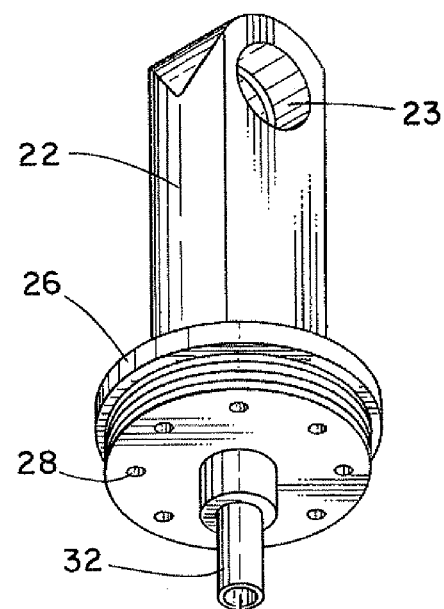
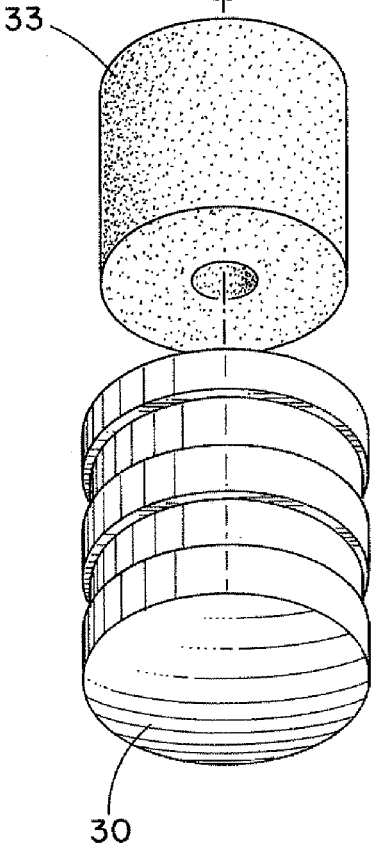
*Fig. 6*

BREATHER FOR A MOTORCYCLE ENGINE

BACKGROUND OF THE INVENTION

1. Field of the Invention

The present invention relates generally to the field of motorcycle engines. More specifically, the present invention discloses an improved breather for crankcase gases from a motorcycle engine.

2. Statement of the Problem

The reciprocating motion of the pistons in the cylinders of a motorcycle engine causes pressure swings in the crankcase that must be vented for efficient operation of the engine. One response to this problem was to simply vent the gases and entrained oil droplets from the crankcase. For example, this can be done through a length of flexible tubing that extends downward toward the pavement. This creates a mess, particularly if the motorcycle is parked in a garage or on a driveway. Nonetheless, this was the solution used in many Harley-Davidson motorcycle engines until the mid-1980s.

Current environmental regulations require that motorcycle manufacturers must route gases vented from the crankcase through the engine intake to reduce pollution. Many modern Harley-Davidson engines, such as the "Evolution" and "Twin Cam" engines, route gases from the crankcase upward through the push rod covers 14 into the rocker boxes 12 above the cylinder heads as shown in FIGS. 2(a)-2(c). An umbrella valve 15 allows gas flow in only one direction through each rocker box. Some oil droplets are trapped at this point in the rocker box 12 and drain back through the engine via a drain hole 17 adjacent to the umbrella valve 15. The remaining crankcase gases and entrained oil droplets exit through a threaded fitting 16 and tube leading to the air intake for the carburetor (not shown). Unfortunately, this tends to "gunk up" the carburetor and intake manifold, and reduces engine performance.

As a result, a number of after-market companies have developed retrofit breathers to directly vent crankcase gases, instead of routing these gases through the engine. These breathers typically vent the crankcase gases through a small metal chamber or canister with slots or openings in its side or bottom. This also creates a mess by spraying oil droplets against the exterior of the engine or the rider's leg. Therefore, a need exists for a breather that can be readily retrofit to a motorcycle engine and that effectively traps oil droplets entrained with the crankcase gases.

The prior art in this general field includes the following:

| Inventor | U.S. Pat. No. | Issue Date |
|---|---|---|
| Ussery | 3,834,365 | Sep. 10, 1974 |
| DeBruler | 4,453,525 | Jun. 12, 1984 |
| Sakano et al. | 4,459,966 | Jul. 17, 1984 |
| Blanc et al. | 5,205,848 | Apr. 27, 1993 |
| Sanders | 5,551,409 | Sep. 3, 1996 |
| Daidone | 6,105,560 | Aug. 22, 2000 |
| Wilson | 6,167,849 | Jan. 2, 2001 |
| Knowles | 6,729,316 | May 4, 2004 |
| Michel | 6,925,994 | Aug. 9, 2005 |

Wilson discloses a crankcase breather for motorcycles that has a canister with a removable lid and a downwardly-extending inlet tube. The filter element is attached to the outlet port above the lid, rather than being placed inside the canister. Any oil collecting in the canister can be drained through a petcock in the bottom of the canister.

DeBruler discloses a canister and a flow path similar to the Wilson patent. A thin filter element extending across the midsection of the canister traps sludge and liquids in the bottom of the canister. The outlet port routes vapors to the intake manifold of the engine, rather than directly into the atmosphere.

Ussery shows another example of a crankcase breather that uses a canister with an outlet in the lid, Ussery uses a small quantity of fuel in the canister as the filter media.

Michel, Daidone, Sanders and Blanc et al. show other examples of breather tubes and vents with filters or baffles. Knowles and Sakano et al. show other examples of systems that filter crankcase gases and recycle them through the engine.

3. Solution to the Problem

None of the prior art references discussed above show a breather having the structure of the present invention. In particular, the present invention creates a flow path within the breather that traps the entrained oil droplets in the bottom of the container and filter media. The container can be periodically unthreaded from the stem to remove the accumulated oil.

SUMMARY OF THE INVENTION

This invention provides a breather for a motorcycle engine to separate and trap oil droplets entrained with crankcase gases. The breather has a container with a removable lid, an inlet for crankcase gases and entrained oil droplets extending through the lid into the container, filter media within the container surrounding the inlet to trap entrained oil droplets in the crankcase gases in the container, and outlet ports in the lid allowing gases to escape from within the container.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 5 is a perspective view of the breather 20.

FIG. 6 is an exploded perspective view of the breather 20.

DETAILED DESCRIPTION OF THE INVENTION

Figure 1:
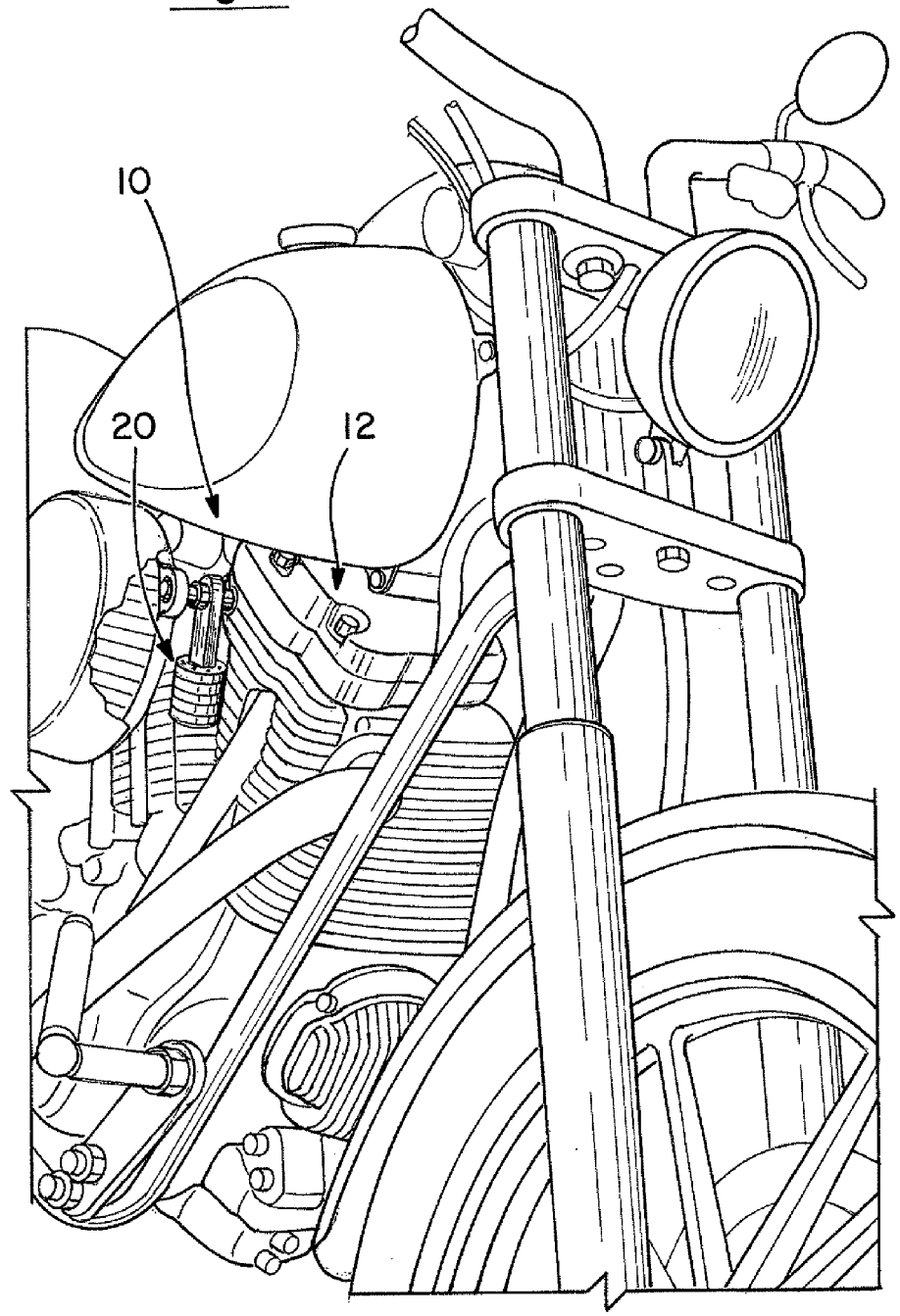
FIG. 1 is a perspective view of a portion of a motorcycle engine 10 showing a breather 20.
Figure 7:
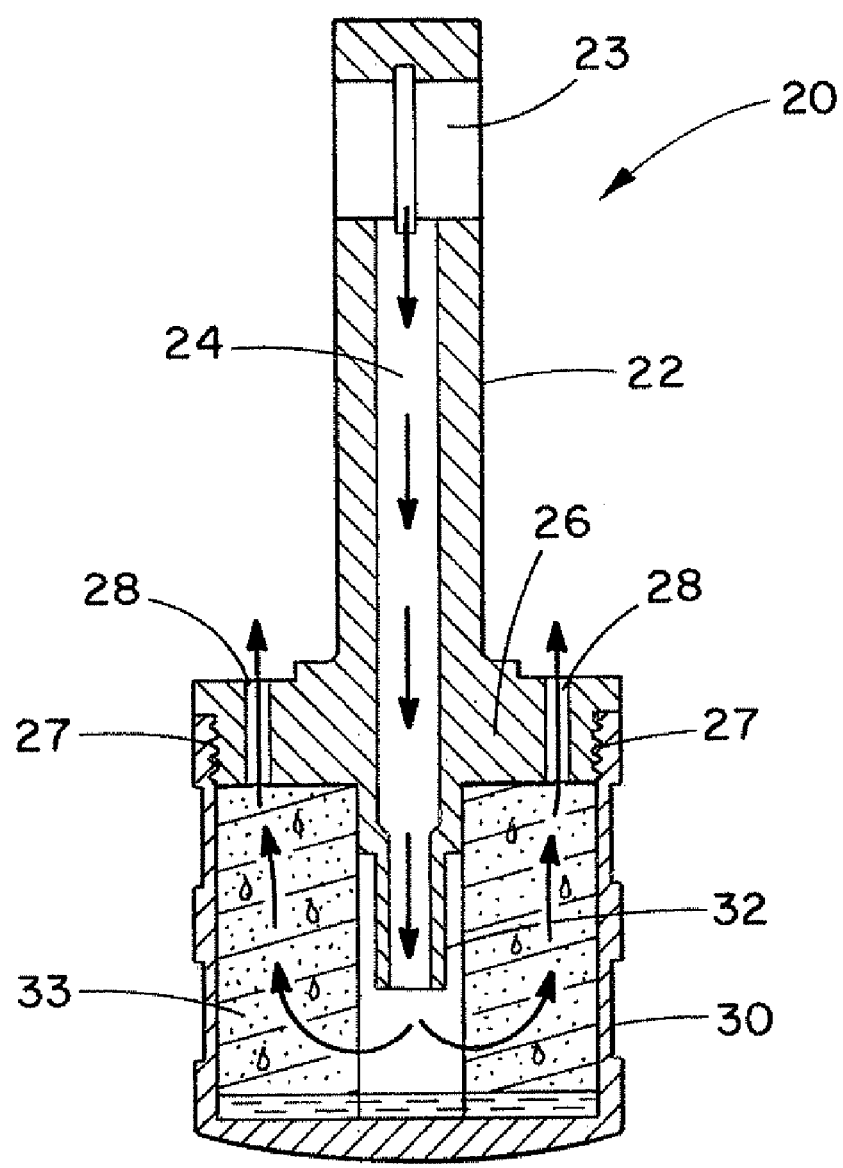
FIG. 7 is a cross-sectional view of the breather 20.

Turning to FIG. 1, a perspective view is shown of a portion of a motorcycle engine 10 with a breather 20 installed. The breather 20 is shown in greater detail in the perspective view shown in FIG. 5 and in the exploded perspective view provided in FIG. 6. The breather 20 includes a container 30 having an interior volume and an upper opening. A lid 26 can be removably attached over the upper opening of the container 30. In the embodiment shown in the drawings, the container 30 is a generally cylindrical canister with a round lid 26. Preferably, threads 31 around the open upper end of the container 30 engage corresponding threads 27 on the rim of the lid 26 as shown in FIGS. 6 and 7. However, other types of fasteners could be employed to removably secure the lid 26 to the container 30. For example, the lid 26 could be held in place on the open upper end of the container 30 by a friction fit or a snap fit.

Filter media 33 is placed within the container 30. Preferably, the filter media 33 is an annular piece of foam material that is removable from within the container 30, as shown in FIG. 6. The lid 26 includes an inlet 32. For example, the embodiment shown in the drawings includes an inlet tube extending some distance downward into the interior of the container 30. The central passageway in the annular filter media 33 is axially aligned with the inlet 32 so that crankcase gases and entrained oil droplets exiting the inlet 32 are directed downward through the central passageway in the filter media 33 to the bottom of the container 30. It should be understood that other types and shapes of filter media could be substituted.

The lid 26 also includes a number of outlet ports 28 that allow the filtered crankcase gases to escape from within the container 30. Optionally, the upper portion of the container 30 could also be equipped with outlet ports.

An elongated stem 22 extends upward from the lid 26 as illustrated in FIGS. 5 through 7. A pass-through hole 23 passes through the upper end of the stem 22 to receive a breather bolt 40 carrying crankcase gases from the engine 10 as will be explained below. A passageway 24 extends downward from the pass-through hole 23 through the length of the stem 22 to the inlet 32 inside the container 30, as shown in the cross-sectional view of the breather 20 depicted in FIG. 7.

Figure 2:
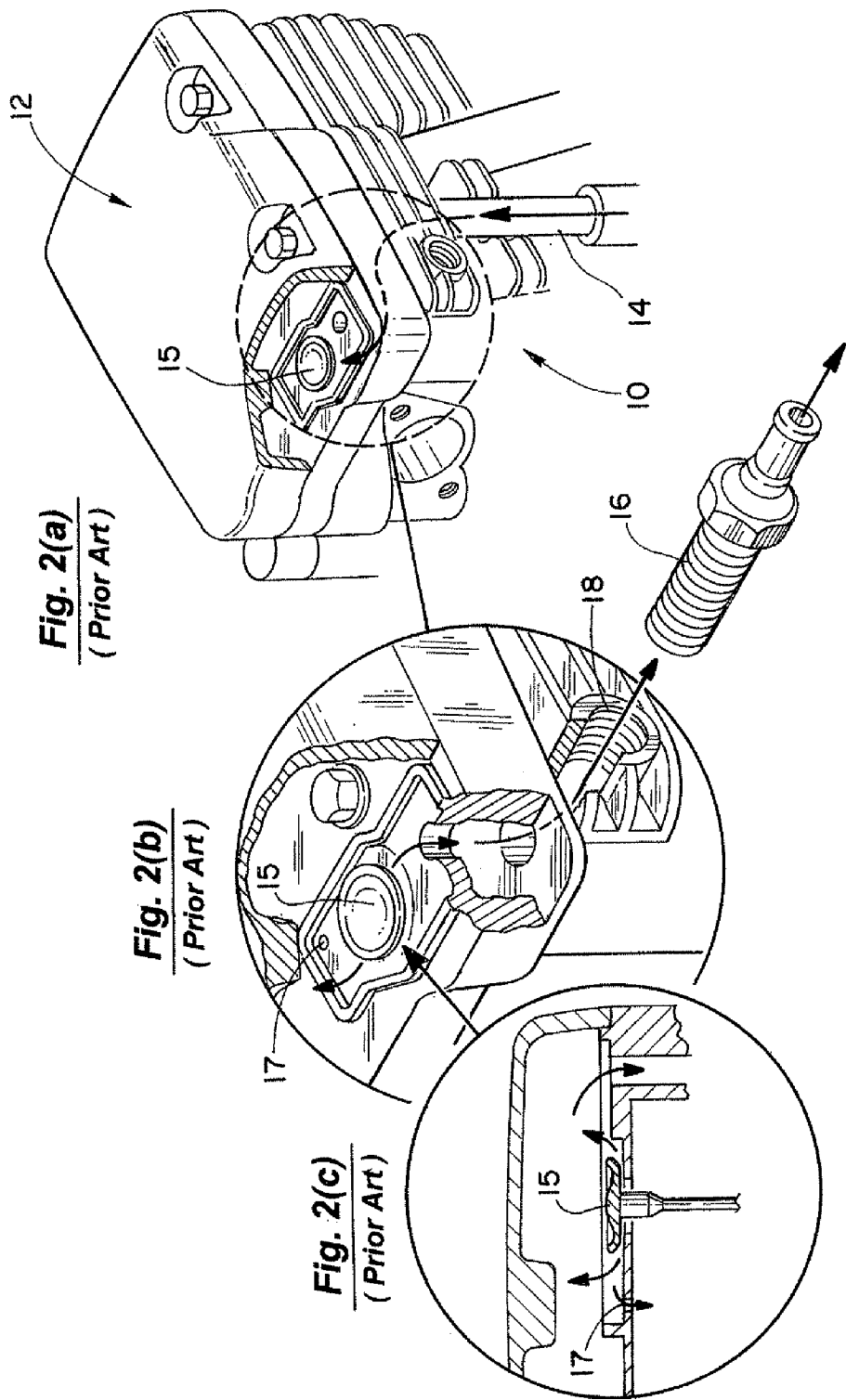
FIG. 2(a) is a detail perspective view of a portion of a motorcycle engine 10 with a section of the rocker box 12 cut away.
FIG. 2(b) is an enlarged perspective view corresponding to FIG. 2(a) showing the umbrella valve 15 and the flow path of crankcase gases.
FIG. 2(c) is a detail cross-sectional view corresponding to FIGS. 2(a) and 2(b) showing the umbrella valve 15.
Figure 3:
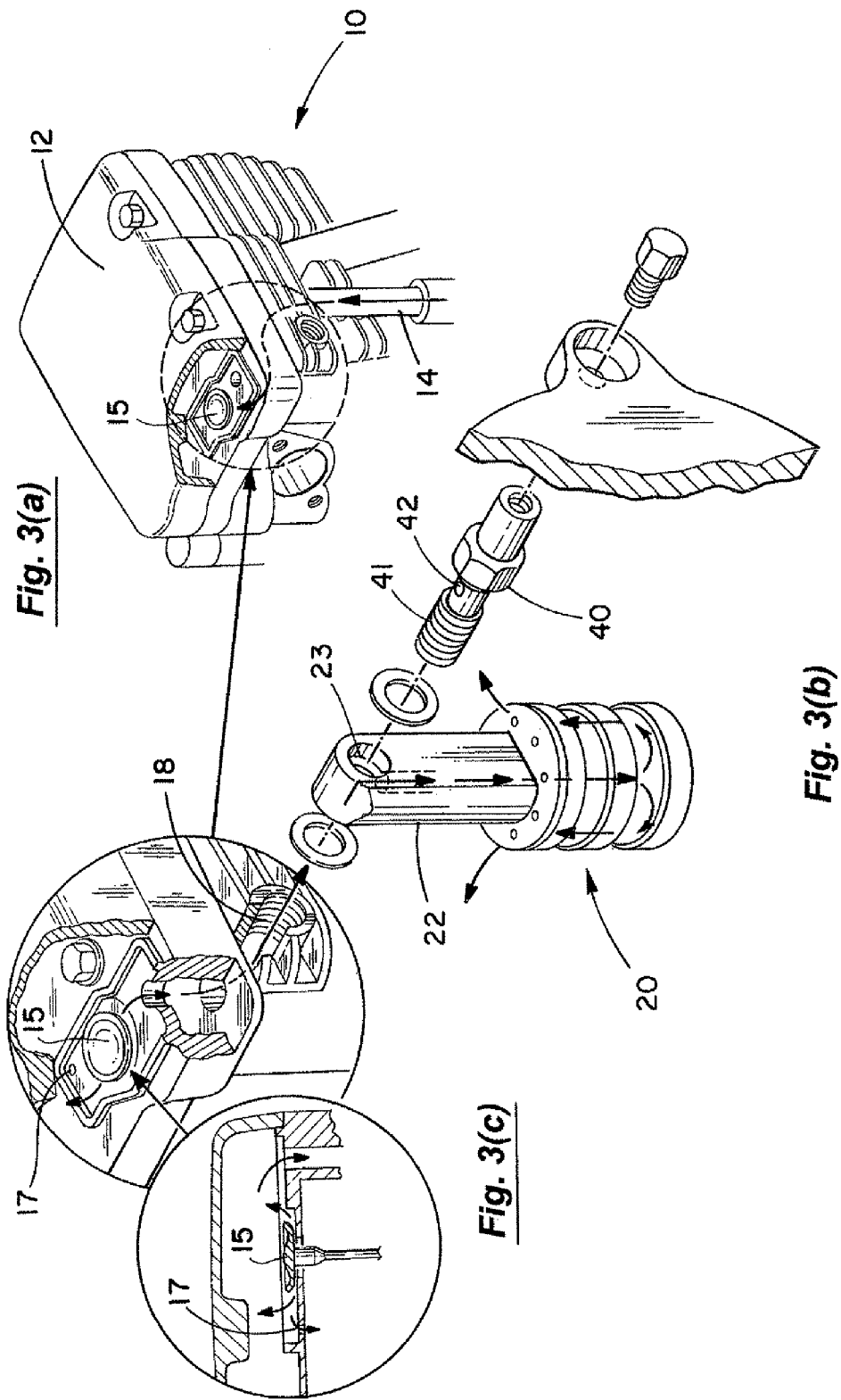
FIG. 3(a) is a detail perspective view of a portion of a motorcycle engine 10 with a section of the rocker box 12 cut away.
FIG. 3(b) is a enlarged perspective view based on FIG. 3(a) showing installation of a breather 20 in an exploded view.
FIG. 3(c) is a detail cross-sectional view corresponding to FIGS. 3(a) and 3(b) showing the umbrella valve 15.
Figure 4:
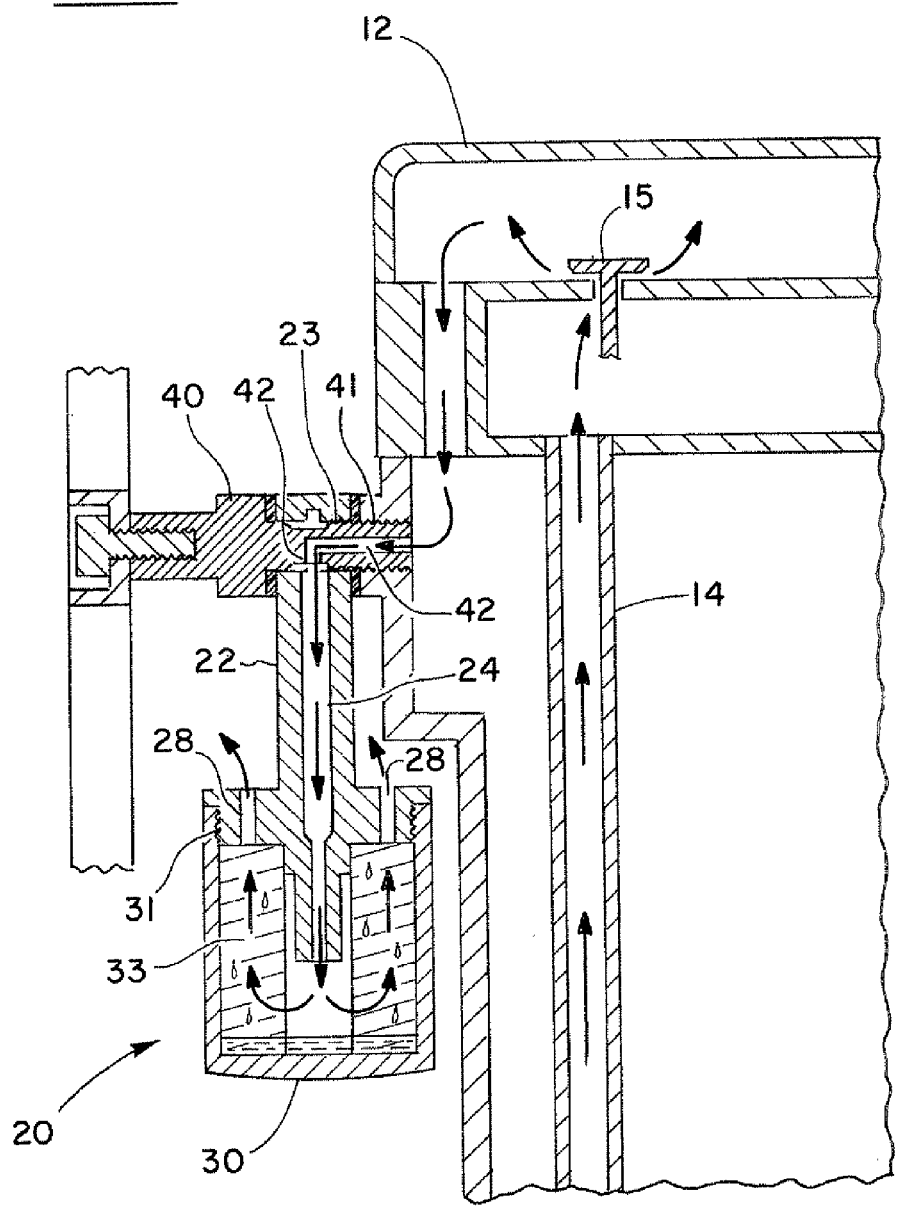
FIG. 4 is a cross-sectional view of the breather 20 and portions of the motorcycle engine 10.

The method of retrofitting the breather 20 to a motorcycle engine 10 is illustrated in FIGS. 3(a) through 3(c) and 4. The existing fitting 16 is first unthreaded from the crankcase gas port 18 on the side of the engine head 12 as shown in FIG. 2(b). A breather bolt 40 with an internal axial passageway 42 is then inserted through the hole 23 in the stem 22 of the breather 20. Any of a variety of conventional, commercially-available breather bolts can be used for this purpose. The threads 41 on the breather bolt engage the threaded port 18 in engine 10, as illustrated in FIG. 3(b). This creates a flow path for crankcase gases and entrained oil droplets from the crankcase upward through the push rod covers 14 into the rocker boxes 12 down the cylinder heads, and then through the breather bolt 40 into the stem 22 of the breather 20.

Within the breather 20, these gases and oil droplets are directed downward through the passageway 24 in the stem 22 and inlet 32 into the interior of the container 30. In particular, crankcase gases and entrained droplets are directed downward by the inlet 23 into the central void in the filter media 33. Gravity and inertia tend to separate the oil droplets so that they collect in the bottom of the container 30. In contrast, the crankcase gases are filtered through the filter media 33 and exit to the atmosphere through the outlet ports 28 in the lid 26 of the breather 20. The accumulated oil trapped in the breather 20 can be cleaned out by unthreading the lid 26 and removing the oil that has accumulated in the bottom of the container 30 and filter media 33.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. A breather for a motorcycle engine comprising:
   a container having an interior volume, an upper opening and a bottom;
   a lid removably covering the upper opening of the container;
   an inlet extending through the lid into the container;
   a stem attached to the lid;
   a hole extending through the stem to receive a breather bolt; and
   a passageway extending from the hole through the stem to the inlet
   filter media within the container trapping entrained oil droplets in the crankcase gases in the bottom of the container; and
   at least one outlet port in the lid allowing gases to escape from within the container.

2. The breather of claim 1 wherein the filter media has a substantially annular shape with a central passageway.

3. The breather of claim 1 wherein the inlet further comprises an inlet tube extending from the lid into the passageway in the filter media.

4. The breather of claim 1 wherein the filter media is removable from the container.

5. The breather of claim 1 wherein the filter media comprises a foam material.

6. The breather of claim 1 wherein the filter media surrounds the inlet.

7. A breather for a motorcycle engine comprising:
   a container having an interior volume and an upper opening;
   a lid removably covering the upper opening of the container;
   an inlet for crankcase gases and entrained oil droplets extending through the lid into the container;
   a stem attached to the lid;
   a hole extending through the stem to receive a breather bolt;
   a passageway extending from the hole through the stem to the inlet;
   annular filter media within the container having a central passageway aligned with the inlet trapping entrained oil droplets in the crankcase gases in the container; and
   at least one outlet port in the lid allowing crankcase gases to escape from within the container.

8. The breather of claim 7 wherein the inlet further comprises an inlet tube extending from the lid into the passageway in the filter media.

9. The breather of claim 7 wherein the filter media is removable from the container.

10. The breather of claim 7 wherein the filter media comprises a foam material.

\* \* \* \* \*